United States Patent
Artini et al.

(10) Patent No.: US 7,089,090 B2
(45) Date of Patent: Aug. 8, 2006

(54) FLIGHT CONTROL INDICATOR DETERMINING THE MAXIMUM SLOPE FOR THE FLIGHT CONTROL OF AN AIRCRAFT BY TERRAIN FOLLOWING

(75) Inventors: Franck Artini, Toulouse (FR); Jean-Pierre Demortier, Maurens (FR); Christophe Bouchet, Toulouse (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 11/118,314

(22) Filed: May 2, 2005

(65) Prior Publication Data

US 2005/0273221 A1    Dec. 8, 2005

(30) Foreign Application Priority Data

May 18, 2004  (FR) .................................. 04 05375

(51) Int. Cl.
*G01C 23/00* (2006.01)

(52) U.S. Cl. ..................... 701/3; 701/5; 701/6; 701/14; 244/181; 340/967

(58) Field of Classification Search .................... 701/3, 701/4, 5, 6, 8, 9, 10, 14, 15, 100; 340/965, 340/967, 963, 966, 976, 974; 244/181
See application file for complete search history.

(56) References Cited

U.S. PATENT DOCUMENTS

| 5,353,022 | A | * | 10/1994 | Middleton et al. | 340/959 |
|---|---|---|---|---|---|
| 5,499,025 | A | * | 3/1996 | Middleton et al. | 340/959 |
| 5,675,328 | A | | 10/1997 | Coirier et al. | |
| 6,175,315 | B1 | * | 1/2001 | Millard et al. | 340/959 |
| 6,253,126 | B1 | * | 6/2001 | Palmer | 701/14 |
| 6,486,799 | B1 | * | 11/2002 | Still et al. | 340/974 |
| 6,937,166 | B1 | * | 8/2005 | Godard et al. | 340/966 |
| 2001/0056316 | A1 | | 12/2001 | Johnson et al. | |

FOREIGN PATENT DOCUMENTS

GB       2310184        8/1997

* cited by examiner

*Primary Examiner*—Richard M. Camby
(74) *Attorney, Agent, or Firm*—Stevens, Davis, Miller & Mosher, LLP

(57) ABSTRACT

The flight control indicator may include a set of information sources, a computation unit connected to said set of information sources, and a head-up display device. The computation unit determines, on the basis of information emanating from the set of information sources, at least one maximum total slope of the aircraft. The maximum total slope corresponds to the maximum thrust and is obtained on the basis of the measurement of the current performance of the aircraft, extrapolated to the condition of maximum slope and in anticipation of an engine fault. The head-up display device presents, on a display screen, at least one indicator which indicates the maximum total slope and which is presented superimposed on the environment existing in front of the aircraft.

5 Claims, 2 Drawing Sheets

FLIGHT CONTROL INDICATOR DETERMINING THE MAXIMUM SLOPE FOR THE FLIGHT CONTROL OF AN AIRCRAFT BY TERRAIN FOLLOWING

FIELD OF THE INVENTION

The present invention relates to a flight control indicator for the flight control of an aircraft by terrain following.

BACKGROUND OF THE RELATED ART

Such a flight control indicator is more specifically adapted to an airplane, in particular a military transport airplane, which exhibits a low thrust/weight ratio and high inertia, and whose maneuvering times are relatively slow.

Although not exclusively, the present invention applies more particularly to low altitude flight. The expression low altitude flight is understood to mean flight along a flight trajectory (at low altitude) allowing an aircraft to follow as closely as possible the terrain overflown, in particular to avoid being pinpointed. Such a flight trajectory at low altitude is therefore situated at a predetermined terrain height, for example 500 feet (or 150 meters).

A low altitude flight therefore presupposes that one is flying as low as possible in valleys so as to benefit from effective masking with the aid of the surrounding relief, while still of course being in a position to be able to overfly the highest peaks that show up in front of the aircraft. When the aircraft is piloted manually by the pilot, that is to say without automatic pilot or flight director engaged, all the burden of low altitude flight control rests on the pilot.

In such a situation, the pilot generally has available only a ground anticollision system, of the GCAS type (GCAS standing for "Ground Collision Avoidance System"), to avoid a collision with the ground. This standard system provides an alarm when a maneuver does not make it possible to overfly the terrain in front of the aircraft, while maintaining defined flight conditions. This system uses theoretical climb models, established through a nominal aircraft, that is to say one which is not degraded. Thus, if the aircraft has suffered damage affecting its climb capabilities, the system provides erroneous information with respect to the current situation. This known system therefore provides no indication as to the actual maximum climb performance of the aircraft.

Consequently, no specific information (based on the current state of the aircraft) regarding the maximum capability of the aircraft to overfly a peak downstream in the direction of flight is available to the pilot. However, it is appreciated that knowledge of the maximum climb capability of the aircraft would allow the pilot to descend as low as possible in valleys until he reaches the limit for being able to climb back and negotiate the peak in front of him, which would increase the masking of the aircraft by the terrain.

SUMMARY OF THE INVENTION

A subject of the present invention is a flight control indicator for aircraft, making it possible to remedy these drawbacks.

To this end, according to the invention, said flight control indicator, of the type comprising:
a set of information sources;
a computation unit which is connected to said set of information sources; and
a display device which comprises a display screen and which is connected to said computation unit, is noteworthy in that:
said computation unit determines, on the basis of information emanating from said set of information sources, at least one maximum total slope of the aircraft, which corresponds to the maximum thrust and is obtained on the basis of the measurement of the current performance of the aircraft, extrapolated to the condition of maximum slope and anticipating an engine fault; and
said display device is a head-up display device and presents, on the display screen, at least one means of indication which indicates said maximum total slope and which is presented superimposed on the environment existing in front of the aircraft.

Advantageously, said set of information sources provides the computation unit with at least some of the following information: the current kinetic state, the current atmospheric state, the current altitude and an aerodynamic polar of the aircraft.

In a preferred embodiment, said computation unit determines said maximum total slope as the slope of the aircraft if it were flying at an optimal climb speed (with the maximum thrust available on the engines) making it possible to obtain the biggest climb slope, and said means of indication indicating this maximum total slope is associated with the relief of the terrain, visible superimposed on said display screen, and makes it possible to show whether the aircraft is capable of flying above said relief of the terrain, when it is flying at said optimal speed (of best slope).

Thus, by virtue of the invention, information is available to the pilot relating to the maximum total slope that the aircraft is in a position to fly, if it adapts its speed (generally reduces it) to said optimal speed. In contradistinction to the aforesaid ground anticollision system, the flight control indicator in accordance with the invention determines the best climb capability at the optimal speed, on the basis of the measurement of the current state of the aircraft. Thus, the pilot has knowledge of the actual maximum performance of the aircraft, relating to the climb slope, and therefore of information regarding the best capability of the aircraft to negotiate the relief (peaks, etc.) of the surrounding terrain.

As a variant, said computation unit can determine said maximum total slope as the slope of the aircraft, if it were flying while maintaining its current speed and whilst selecting the maximum thrust available on the engines. In this case, the pilot has knowledge (by virtue of the invention) of the actual maximum climb performance of the aircraft, while maintaining the current flight speed.

Moreover, as said means of indication is presented directly superimposed on the relief of the terrain, the flight control indicator in accordance with the invention is very advantageous from an operational point of view.

It will be noted that the total slope is a data item which represents the total energy of the aircraft, that is to say the sum of the potential energy and the kinetic energy. Also, said means of indication indicates the split of the current energy of the aircraft between kinetic energy and potential energy and the gain in climb performance that is obtained, if a given quantity of kinetic energy is transformed into potential energy, by adapting (by reducing) the current speed of the aircraft to said optimal speed.

Consequently, by virtue of the invention, it is possible to display the actual climb slope that will be obtained while selecting the maximum engine output for the optimal climb speed (or as a variant, for the current flight speed), as well as the actual climb slope that would be obtained if an engine fault were to occur while selecting the optimum climb speed (or as a variant, while maintaining the current speed), the engines remaining operational being at the maximum output. These indications are in accordance with the actual performance of the aircraft, even in the case of a degraded aircraft (for example open door, stuck flap or accretion of ice, etc.).

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
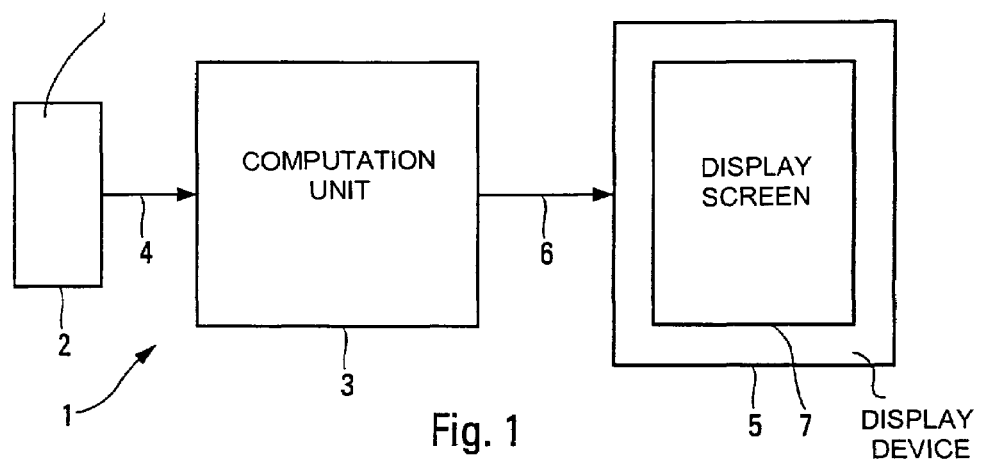
FIG. 1 is the schematic diagram of a flight control indicator in accordance with the invention.

The flight control indicator 1 in accordance with the invention and represented diagrammatically in FIG. 1 is intended to aid a pilot of an aircraft, in particular of a military transport plane, during flight control of this aircraft.

To do this, the flight control indicator 1 which is carried on board the aircraft, comprises:
- a set 2 of information sources specified hereinbelow;
- a computation unit 3 which is connected by a link 4 to said set 2 of information sources; and
- a display device 5 which is connected by a link 6 to said computation unit 3 and which comprises a display screen 7.

Figure 2:
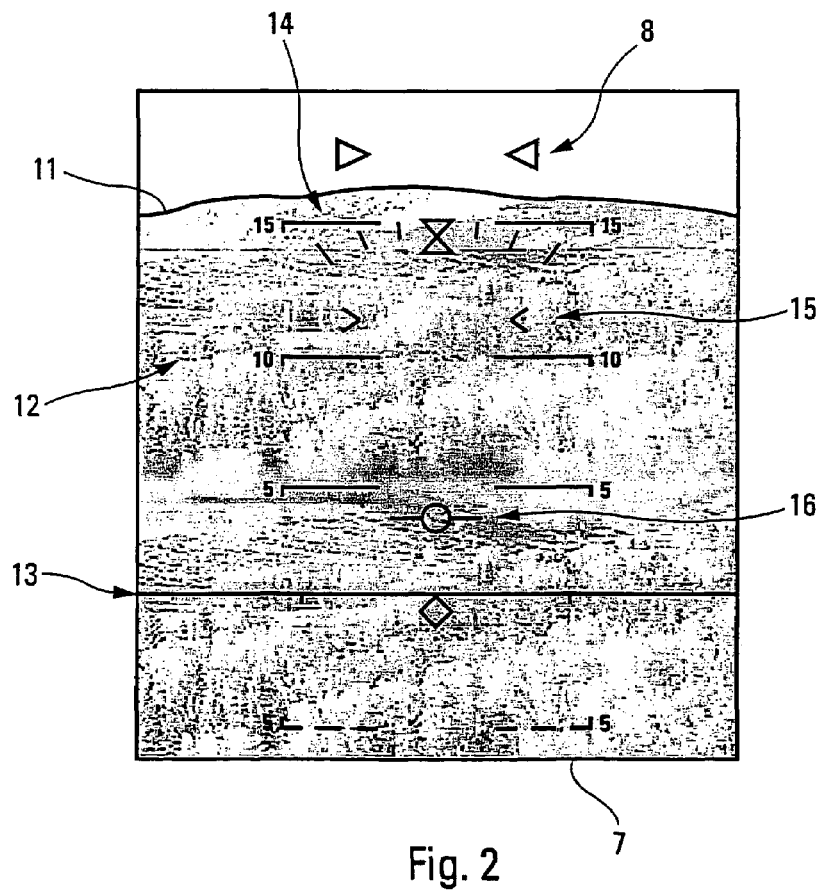
FIG. 2 illustrates a display implemented by a flight control indicator in accordance with the invention.

According to the invention:
the set 2 of information sources provides, in particular, some of the following information:
  the current speed of the aircraft;
  the current engine output;
  the maximum engine output;
  the optimal climb speed;
  the current altitude of the aircraft; and
  an aerodynamic polar of the aircraft, making it possible to integrate the effect of the variation of the speed on the measured current speed, in relation to an optimal climb speed, as well as the aerodynamic degradation due to an engine fault;
said computation unit 3 determines, on the basis of at least the aforesaid information emanating from said set 2 of information sources, the value of at least one maximum total slope of the aircraft, as specified hereinbelow; and
said display device 5 is a head-up display device and presents, on the display screen 7, at least one means of indication 8, 9, 10 which indicates the value of said maximum total slope and which is presented superimposed with the terrain 12 existing towards the front of the aircraft, as represented for example in FIG. 2.

In the preferred embodiment represented in this FIG. 2, said computation unit 3 determines said maximum total slope as the slope of the aircraft, if it were flying at an optimal speed making it possible to obtain the biggest climb slope, and said means of indication 8 indicating this maximum total slope is associated with the relief 11 of the terrain 12, visible superimposed on said display screen 7, and thus makes it possible to show whether the aircraft is capable of flying above said relief 11 of the terrain 12 when it is flying at said optimal speed. This is the case in the example represented in FIG. 2, since said means of indication 8, which comprises for example two arrows, is indeed situated above the relief 11 of said terrain 12. The example of FIG. 2 indicates that the aircraft can pass above the relief 11, if the pilot selects the maximum engine output, reduces his speed (or in a variant specified hereinbelow, maintains his current speed) and pilots the aircraft in such a way that the ground speed vector (indicated by a means of indication 16) reaches the level of said means of indication 8 indicating this optimal total slope.

Thus, by virtue of the flight control indicator 1 in accordance with the invention, information is available to the pilot relating to the maximum slope that the aircraft is in a position to fly if he selects full thrust. The pilot therefore has knowledge of the actual maximum performance of the aircraft, relating to the climb slope and making it possible to negotiate the relief 11 (peaks, etc.) of the terrain 12 in front of the aircraft.

As a variant, said computation unit 3 can determine said maximum total slope as the slope of the aircraft if it were flying while maintaining its current speed and while selecting the maximum thrust available on the engines. In this variant, the pilot has knowledge of the actual maximum climb performance of the aircraft, while maintaining the current flight speed.

Consequently, the present invention is especially advantageous during low altitude flight and thus allows the pilot to fly his aircraft as low as possible (to benefit from the best possible masking by the terrain 12), while indicating to him whether he is still in a position to fly the aircraft above the highest peaks. In order for this to be true, it suffices for said means of indication 8 to lie above the relief 11 of the terrain 12.

Furthermore, as said means of indication 8 is presented directly superimposed on the actual relief 11, the flight control indicator 1 in accordance with the invention is very advantageous from an operational point of view.

In a preferred embodiment, the computation unit 3 computes said maximum total slope γTmax on the basis of the measurement of the current total flight slope, corrected by:
  the variation in total slope due to the variation in engine thrust and in drag caused by selecting the maximum thrust, at the current speed ($\Delta\gamma TFN$);
  the variation in total slope due to the variation in thrust and in drag caused by the anticipated engine fault, at the current speed ($\Delta\gamma TOEI$); and
  the variation in total slope due to the variation in thrust and in drag due to the variation in speed, from the current speed to the optimal speed of best slope ($\Delta\gamma TDV$).

Thus, we obtain $\gamma Tmax = \gamma TS + \Delta\gamma TFN + \Delta\gamma TOEI + \Delta\gamma TDV$ with γTS, the current total flight slope, determined on the basis of the kinetic state and of the attitude of the aircraft, i.e. basically:

$$\gamma TS = \gamma S + \frac{1}{g}\frac{\delta Vs}{\delta t}$$

with:
  g: the acceleration due to gravity;
  γS: the measured ground slope of the aircraft; and
  Vs: the measured ground speed of the aircraft.

The various measurements are carried out by appropriate means forming part of the set 2 of information sources.

The variation in total slope due to the variation in engine output, all engines operational, at the current speed, is expressed by the following relation:

$$\Delta\gamma TFN = \frac{1}{mg}[neng(FN\max - FN) - \Delta TFN]$$

in which:
  neng is the number of engines operational;
  FN is the current thrust delivered by each engine, obtained by measuring engine parameters;
  FNmax is the maximum thrust that each engine can deliver at the current speed. It is obtained either by the engine systems, or by a model integrated into the set 2;
  g is the acceleration due to gravity;
  m is the mass of the aircraft, provided by systems of the aircraft; and
  ΔTFN is the variation in the drag force due to the variation in thrust (FNmax−FN), obtained through a model which is integrated into the set 2.

Moreover, the variation in total slope due to the anticipation of the engine fault, at the current speed, satisfies the following relation:

$$\Delta\gamma TOEI = \frac{1}{mg}[FNWML - FN\max - \Delta TOEI]$$

in which:
  FNWML is the residual thrust of the faulty engine; and
  ΔTOEI is the variation in the drag force due to the aerodynamic balancing of the faulty engine, obtained through a model integrated into the set 2.

Furthermore, the variation in total slope due to the variation in speed from the current speed to the optimal speed of best slope, is expressed through the following relation:

$$\Delta\gamma TDV = \frac{1}{mg}[nop(FN\max GD - FN\max) - \Delta TDV]$$

in which:
  FNmax is the maximum thrust for each engine at the current speed;
  FNmaxGD is the maximum thrust for each engine at the optimal speed of best slope, obtained through a model integrated into the set 2;
  nop is the number of engines operational and corresponds to:
    neng, if all the engines are operating; and
    neng-1, to anticipate an engine fault; and
  ΔTDV is the variation in the drag force due to the variation in speed from the current speed to the optimal speed of best slope.

Furthermore, the display device 5 can also depict on the display screen 7 at least the following elements represented in FIG. 2:
  a heading scale 13;
  a slope scale 14;
  a means of indication 15, for example two chevrons, indicating the current total slope of the aircraft; and
  a means of indication 16 indicating the position of the ground speed vector.

Figure 3:
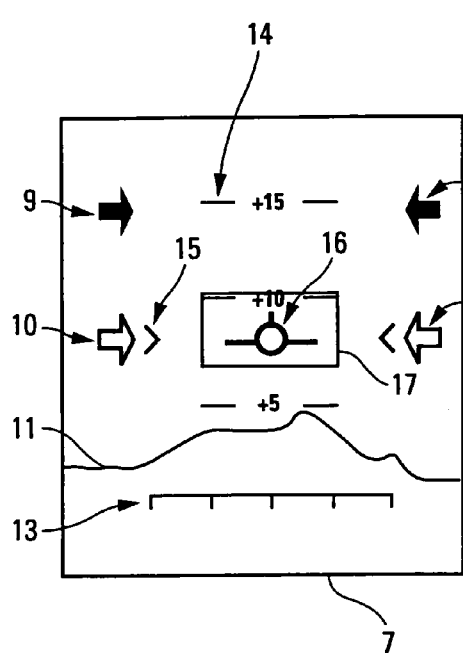
FIGS. 3 to 5 illustrate particular displays capable of being implemented by a flight control indicator in accordance with the invention.
Figure 4:
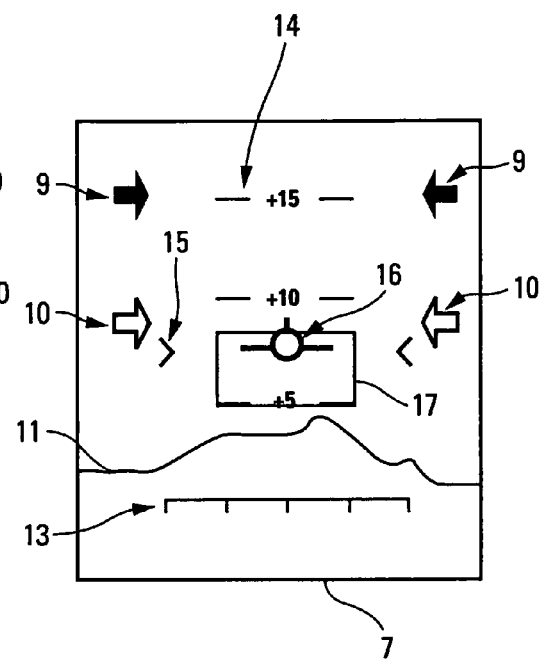
Figure 5:
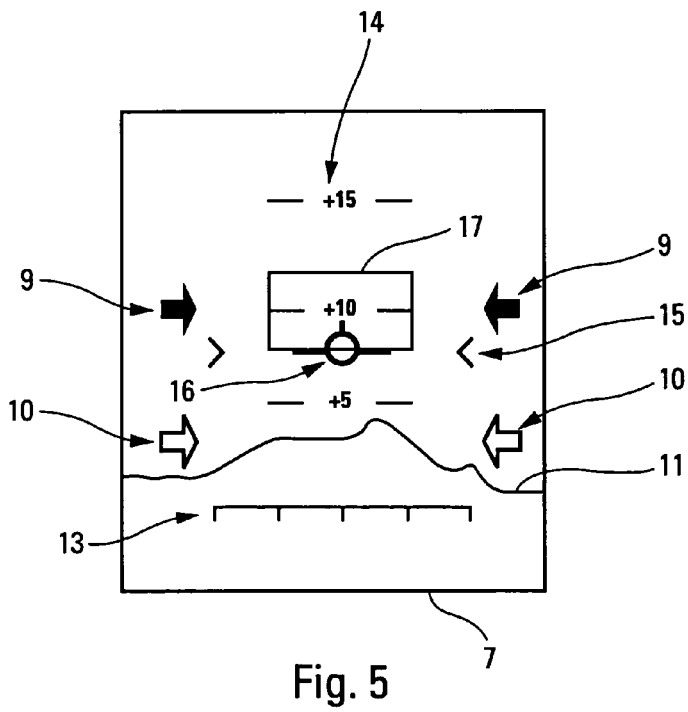

In a particular embodiment:
  said computation unit 3 determines:
    a first total slope corresponding to a maximum total slope γTmaxAEO with all the engines of the aircraft operational, that is to say in an AEO phase (AEO standing for "All Engine Operative"), at the continuous power of the engines; and
    a second total slope corresponding to a maximum total slope γTmaxOEI with an engine of the aircraft faulty, that is to say in an OEI phase (OEI standing for "One Engine Inoperative"), with maximum power on the other engines; and
  said display device 5 presents, on the display screen 7, two means of indication 9 and 10 indicating respectively said first and second total slopes, as are represented in FIGS. 3 to 5.

In this case, the flight control indicator 1 displays the actual performance of the aircraft in the vertical plane.

In addition to the aforesaid elements, the display device 5 can also depict on the display screen 7, as represented in FIGS. 3 to 5, a means of indication 17 indicating a preset slope (that is to say the slope at which to fly as instructed by the flight plan), which is for example symbolized by a rectangle drawn with a narrow line. It will be noted that the means of indication 17 is also beneficial when the aircraft is not guided automatically, and the pilot follows a flight preset.

Moreover:
  the means of indication 9 comprises two solid arrows disposed on either side of the display screen 7, opposite the slope scale 14; and
  the means of indication 10 comprises two hollow arrows disposed likewise on either side of the display screen 7, opposite the slope scale 14.

It will be noted that if the means of indication 16 indicating the ground speed vector is placed at the center of the means of indication 17 indicating the preset slope, the aircraft is currently flying at said preset slope at the right speed.

In the examples represented in FIGS. 3 to 5, it is considered that the means of indication 16 (ground speed vector) is aligned with the means of indication 15 (current total slope), thereby signifying that the aircraft exhibits a stabilized speed, that is to say is not accelerating or decelerating.

In the example represented in FIG. 3, the aircraft is in the condition where the preset corresponds to the climb limit OEI. It is flying along a constant slope trajectory segment defined by the flight plan. The second total slope OEI (means of indication 10) is identical to that defined by the flight plan and the first total slope (means of indication 9) is greater than it by around 7°. In this example, even if an engine fault occurs during the flight, the aircraft is capable of continuing its flight while maintaining both its current speed and the current slope of the segment defined by the flight plan.

Moreover, in the example of FIG. 4, the aircraft is in a "conservative" condition, since the second total slope OEI (means of indication 10) is slightly greater than the slope required for the flight (means of indication 17).

In this example, even if an engine fault occurs during the flight, the aircraft is capable of continuing its flight while maintaining the current slope, as defined by the flight plan. An energy reserve is even available to the aircraft.

Furthermore, in the example represented in FIG. 5, the aircraft is in a "critical" condition. Specifically, the ground slope (means of indication 16) is less than the slope required for the flight (means of indication 17). Additionally, the second total slope OEI (means of indication 10) is much less than the slope required.

As the slope required or preset slope (means of indication 17) is greater than the second total slope (means of indication 10), one is in the presence of a slope computation that is not tailored for the case of an engine fault in the flight plan. This situation may result from a failure of the computations for generating the preset (hence the flight plan) or else actual weather conditions that are very different from those which served to construct the flight plan, or an aircraft whose state is degraded with respect to the state used for the modeling (aerodynamic degradation: panel remaining open, landing gear stuck mid-way, accretion of ice, etc., or engine degradation: inception of a fault, propeller damaged, etc.).

Consequently, if in this example a fault occurs with an engine of the aircraft during the flight, the aircraft will not be able to hold the required slope. It is therefore at risk of passing below the defined vertical profile and of coming dangerously close to the relief 11 of the terrain 12.

The invention claimed is:

1. A flight control indicator for an aircraft, said flight control indicator comprising:
   a set of information sources;
   a computation unit which is connected to said set of information sources; and
   a display device which comprises a display screen and which is connected to said computation unit, wherein
   said computation unit determines, on the basis of information emanating from said set of information sources, at least one maximum total slope of the aircraft, which corresponds to the maximum thrust and is obtained on the basis of the measurement of the current performance of the aircraft, extrapolated to the condition of maximum slope and anticipating an engine fault; and
   said display device is a head-up display device and presents, on the display screen, at least one indicator which indicates said maximum total slope and which is presented superimposed on the environment existing in front of the aircraft.

2. The flight control indicator as claimed in claim 1, wherein said set of information sources provides the computation unit with at least some of the following information: the current kinetic state, the current atmospheric state, the current altitude and an aerodynamic polar of the aircraft.

3. The flight control indicator as claimed in claim 1, wherein said computation unit determines said maximum total slope for the optimal climb speed.

4. The flight control indicator as claimed in claim 1, wherein said computation unit determines said maximum total slope for the current speed.

5. An aircraft, which comprises a flight control indicator as specified under claim 1.

* * * * *